United States Patent Office 3,552,913
Patented Jan. 5, 1971

3,552,913
METHOD OF DECOMPOSING NITROGEN OXIDES
Ruth E. Stephens, Detroit, Mich., assignor to Ethyl Corporation, New York, N.Y., a corporation of Virginia
No Drawing. Original application Aug. 31, 1966, Ser. No. 576,202, now Patent No. 3,483,138, dated Dec. 9, 1969. Divided and this application July 22, 1969, Ser. No. 843,772
Int. Cl. B01d 53/00
U.S. Cl. 23—2                                6 Claims

ABSTRACT OF THE DISCLOSURE

A method of decomposing nitrogen oxide is provided by contacting an oxide of nitrogen-containing gas with a suitable catalyst, said catalyst consisting of 0.001 to 25 weight percent of neodymium in an oxide form, usually with a catalyst support.

CROSS-REFERENCE TO RELATED APPLICATION

This application is a division of applicant's prior copending application Ser. No. 576,202, filed Aug. 31, 1966, now Pat. No. 3,483,138, dated Dec. 9, 1969.

BACKGROUND OF THE INVENTION

This invention relates to a catalyst eminently useful for decomposing oxides of nitrogen. In particular, this invention relates to a neodymium oxide catalyst and a method of decomposing oxides of nitrogen employing this catalyst.

The exhaust gas of internal combustion engines contains unburned hydrocarbons, carbon monoxide, nitrogen oxides and oxygen, among other materials. Investigators have reported that nitrogen oxides in the presence of sunlight lead to ozone formation, and that ozone reacts with hydrocarbon substituents in the atmosphere to form noxious materials. Therefore, extensive research has been carried out directed to means of removing the precursor materials, nitrogen oxides and hydrocarbons, from the atmosphere. The present invention describes a catalyst and method of using this catalyst to reduce the oxides of nitrogen content of the atmosphere by contacting exhaust gas of internal combustion engines or other exhaust streams containing oxides of nitrogen with a highly selective catalyst.

An object of this invention is to provide a catalyst capable of rendering oxides of nitrogen less noxious. A further object is to provide a catalyst for decomposing nitrogen oxides into nitrogen and oxygen. A still further object is to provide a catalytic means of reducing the oxide of nitrogen content of gas streams containing nitrogen oxides. A particular object is to provide a catalytic means of reducing the nitrogen oxides content of the exhaust gas of internal combustion engines.

SUMMARY OF THE INVENTION

These and other objects are accomplished by providing a catalyst consisting essentially of a catalyst support containing from about 0.001 to 25 weight percent of neodymium in an oxide form.

DESCRIPTION OF THE PREFERRED EMBODIMENTS

In a preferred embodiment, the catalyst consists essentially of a catalyst support selected from the group consisting of alumina, magnesia, zirconia, silica, silica alumina, zinc oxide, zircon, mullite and kaolin, or mixtures of these support materials, containing from 0.001 to 25 weight percent neodymium in an oxide form.

In a highly preferred embodiment, the catalyst consists essentially of zinc oxide containing from 0.001 to 25 weight percent neodymium in an oxide form.

Suitable supports for the catalysts include all the materials normally used for catalyst supports that are capable of being used in the particular environment in which use is intended and which does not destroy the catalytic activity of the neodymium oxide. Examples of such materials include alumina, magnesia, zirconia, silica, silica alumina, zinc oxide, zircon, mullite, kaolin, and the like, including supports prepared from mixtures of these ingredients.

The catalyst can be prepared by any one of the many methods known to catalyst manufacturers. A suitable support can be merely impregnated with a solution of a soluble salt of neodymium, such as neodymium nitrate or neodymium acetate, followed by calcining to decompose the salt to an oxide form. Another method is to mix neodymium oxide with a precursor of the support material. For example, an alumina gel can be formed by adding sodium hydroxide to an acidic solution of an aluminum salt such as aluminum nitrate dissolved in aqueous nitric acid. Neodymium oxide powder can be mixed with the gel forming a paste, which is extruded, dried and then calcined. In a similar manner, the neodymium may be in solution together with the aluminum salt and coprecipitate with the gel when base is added. The resulting gel can be extruded, dried, and calcined, or mixed with other support material such as kaolin, forming a paste which is then extruded, dried, and calcined.

The following examples will serve to illustrate several of the methods available for preparing the neodymium oxide containing catalysts of this invention. All parts are parts by weight unless otherwise specified.

EXAMPLE 1

A neodymium containing solution was prepared by adding 68 parts of neodymium oxide to a solution containing 36 parts glacial acetic acid, 49.7 parts of 70 percent nitric acid and 200 parts of water. 3.2 parts of this solution were mixed with 8 parts of neodymium oxide, forming a paste. This paste was dried in an oven at 105° C. until the free water had been removed. It was then broken up into small pieces and calcined by heating to a temperature of 700° C. The resultant unsupported neodymium oxide catalyst effectively catalyzed the decomposition of nitric oxide to nitrogen and oxygen.

EXAMPLE 2

A zinc oxide supported neodymium oxide containing catalyst was prepared as follows. To 6 parts of the neodymium solution prepared in Example 1 was added 10 parts of an extruded zinc oxide catalyst support (obtained from Harshaw Chemical Company, Catalog No. 0401E). After the zinc oxide support had become thoroughly impregnated, it was dried in an oven at 105° C. and then calcined at 700° C. for one hour, resulting in a zinc oxide supported catalyst containing 1.1 percent neodymium in an oxide form.

EXAMPLE 3

To a mixing vessel is added 200 parts of neodymium oxide, 692 parts of activated alumina and 1300 parts of hydrated alumina (28 percent $H_2O$). These materials are mixed for 10 minutes. Following this, 100 parts of an aqueous nitric acid solution containing 15 parts of 70 percent nitric acid is added. Mixing is continued while 130 additional parts of hydrated alumina are slowly added. A plastic mass is formed due to the gelling of the hydrated alumina. This material is extruded through a $\frac{3}{16}$ inch die into pieces about ¼ inch long. The extrudate is dried, and then calcined at 750° C. for an hour, resulting in an alumina supported catalyst containing 9.5 percent neodymium in an oxide form.

EXAMPLE 4

To a mixing vessel is added 400 parts of neodymium oxide, 460 parts of activated alumina, 230 parts of kaolin and 1300 parts of hydrated alumina (28 percent $H_2O$). These materials are thoroughly mixed and then an aqueous solution containing 13 parts of 70 percent nitric acid in 100 parts of water is added. While mixing, an additional 140 parts of hydrated alumina is added and mixing is continued until a plastic mass forms. This material is extruded through ¼ inch die forming pieces ¼ inch long. This extrudate is dried at 150° C. until all free water is evaporated and then calcined at 650° C. for 2 hours, resulting in an alumina-kaolin supported catalyst containing 16.4 percent neodymium in an oxide form.

EXAMPLE 5

In an impregnating vessel is placed 1000 parts of an activated alumina containing 5 percent silica. To this is added an aqueous solution containing 300 parts of neodymium nitrate in sufficient water to cover the silica alumina. The mixture is allowed to stand until the silica alumina has absorbed most of the solution. Following this, the impregnated support is dried in an oven at 150° C. until most of the free water has evaporated, and then calcined at 800° C. for 2 hours, causing the neodymium nitrate to decompose to the oxide form. The resulting catalyst is a silica alumina supported catalyst containing 14 percent neodymium in an oxide form.

EXAMPLE 6

In an impregnating vessel is placed 1000 parts of magnesia pellets. To this is added an aqueous solution containing 500 parts of neodymium nitrate in sufficient water to cover the magnesia. The mixture is allowed to stand for 2 hours and the remaining water is removed by evaporation in an oven at 150° C. After the free water has been evaporated the remaining catalyst is calcined at 750° C. for one hour. The resulting catalyst is a magnesia supported catalyst containing about 25 percent neodymium in an oxide form.

In the foregoing examples, support materials other than those used can be employed. For example, alumina, magnesia, zirconia, silica, silica alumina, zinc oxide, zircon, mullite, kaolin, and the like, can be used, resulting in a supported neodymium oxide catalyst.

In like manner, the concentration of the neodymium in the catalyst can be varied by using different concentrations of neodymium solutions or, when following the procedure of Examples 1–4, using different quantities of neodymium oxide in the preparation.

Tests have been carried out which demonstrate the ability of neodymium oxide to catalyze the decomposition of oxides of nitrogen. In these tests a stream of helium was passed through a heated catalyst bed and then through a vapor phase chromatograph. The vapor phase chromatograph was adjusted to baseline with the helium stream. A small amount of nitric oxide was then injected into the helium stream ahead of the catalyst bed. The vapor phase chromatograph then determined the composition of the gas stream after contacting the catalyst.

The above test was carried out using a neodymium oxide catalyst as prepared in Example 1. The bed temperature was maintained at 700° C. The vapor phase chromatograph showed that the nitric oxide had been decomposed into nitrogen and oxygen.

Another test was conducted using a zinc oxide supported catalyst as prepared in Example 2. This catalyst was maintained at 750° C. and decomposed essentially all the nitric oxide which passed through it. In order to determine if the decomposition was due to the zinc oxide or to the neodymium oxide, a further test was carried out on the zinc oxide support and it was found to be inactive.

Further tests were conducted by passing the exhaust gas from a single cylinder 36 cubic inch spark ignited engine through a catalyst bed containing an alumina supported neodymium oxide catalyst. A significant reduction in the oxides of nitrogen in the exhaust gas was observed.

In order to use the catalyst in an internal combustion engine exhaust system, the catalyst is incorporated in a suitable manner into the exhaust system of the engine. One method commonly used is to place the catalyst in a so-called "catalytic muffler." Examples of these are disclosed in U.S. Pats. 3,154,389; 3,149,925; 3,149,926 and 3,146,073, among others. Essentially these are containers having an opening to receive and discharge the exhaust gas. To firmly retain the catalyst material, the receiving and discharge openings are covered with wire screen. The container may have internal baffling to allow greater contact between catalyst and exhaust gas or to use the hot reaction gases to heat the incoming exhaust gases. The container may actually replace the vehicle muffler or may be incorporated into the conventional exhaust system of current vehicles. The catalyst bed may also be located in the exhaust manifold of the engine.

The neodymium oxide catalyst may be used by itself or it may be used in conjunction with a second catalyst whose function is to oxidize the hydrocarbon or carbon monoxide constituents of the exhaust gas. A catalyst eminently suited for this purpose is a supported copper-palladium catalyst as described in U.S. Pat. 3,224,981. The neodymium oxide catalyst may be intimately mixed with the oxidation catalyst or the different catalysts may be stratified.

When used to decompose oxides of nitrogen in streams other than the exhaust stream of internal combustion engines the catalyst is merely incorporated in the oxide of nitrogen containing stream so that intimate contact is obtained between the catalyst and the oxides of nitrogen. For example, in the discharge stream of a nitric acid plant employing the ammonia process for synthesizing nitric acid the spent gas containing nitric oxide is passed through the neodymium oxide catalyst bed and the temperature of the bed maintained at a temperature of from about 400 to 1000° C.

I claim:

1. A method of decomposing oxides of nitrogen, said method comprising contacting an oxide of nitrogen-containing gas with a catalyst consisting essentially of a catalyst support and from 0.001 to 25 weight percent of neodymium in an oxide form, at a temperature of from about 400 to about 1000° C.

2. A method of claim 1 wherein said catalyst support is selected from the group consisting of zinc oxide, zirconia, zircon, alumina, magnesia, silica, silica alumina, mullite, and kaolin.

3. A method of claim 2 wherein said support consists of zirconia.

4. A method of claim 2 wherein said support consists of zinc oxide.

5. A method of claim 1 wherein said oxide of nitrogen-containing gas is an exhaust gas stream from an internal combustion engine.

6. A method of claim 1 wherein said oxide of nitrogen-containing gas is a discharged stream from a nitric acid plant.

References Cited

UNITED STATES PATENTS

| | | | |
|---|---|---|---|
| 3,351,562 | 11/1967 | Taylor | 23—2X |
| 3,459,494 | 8/1969 | Harris et al. | 23—2 |

EARL C. THOMAS, Primary Examiner

U.S. Cl. X.R.

23—157, 220, 21